(12) United States Patent
Hidaka et al.

(10) Patent No.: US 12,398,819 B2
(45) Date of Patent: Aug. 26, 2025

(54) CONTROLLER AND VAPORIZATION SUPPLY DEVICE

(71) Applicant: FUJIKIN INCORPORATED, Osaka (JP)

(72) Inventors: Atsushi Hidaka, Osaka (JP); Kazuteru Tanaka, Osaka (JP); Takatoshi Nakatani, Osaka (JP); Kazuyuki Morisaki, Osaka (JP); Masafumi Kitano, Osaka (JP); Kaoru Hirata, Osaka (JP); Masaaki Nagase, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 17 days.

(21) Appl. No.: 18/552,826

(22) PCT Filed: Mar. 8, 2022

(86) PCT No.: PCT/JP2022/010096
§ 371 (c)(1),
(2) Date: Sep. 27, 2023

(87) PCT Pub. No.: WO2022/209639
PCT Pub. Date: Oct. 6, 2022

(65) Prior Publication Data
US 2024/0167577 A1 May 23, 2024

(30) Foreign Application Priority Data
Apr. 1, 2021 (JP) .................. 2021-063133

(51) Int. Cl.
*F16K 25/00* (2006.01)
*F16K 7/17* (2006.01)
*G05D 7/06* (2006.01)

(52) U.S. Cl.
CPC .............. *F16K 25/005* (2013.01); *F16K 7/17* (2013.01); *G05D 7/0635* (2013.01)

(58) Field of Classification Search
CPC ............ F16K 25/005; F16K 7/17; F16K 7/16; G05D 7/0635
See application file for complete search history.

(56) References Cited

U.S. PATENT DOCUMENTS 6,105,933 A * 8/2000 Kanno ...................... F16K 7/16
251/117
7,416,165 B2 * 8/2008 Ohmi ...................... F16K 51/02
251/368

(Continued)

FOREIGN PATENT DOCUMENTS

JP    H08-312812 A    11/1996
KR    10-2003-0061340 A    7/2003

(Continued)

OTHER PUBLICATIONS

International Search Report issued in PCT/JP2022/010096; mailed Apr. 19, 2022.

(Continued)

*Primary Examiner* — Michael R Reid
(74) *Attorney, Agent, or Firm* — Studebaker Brackett PLLC

(57) ABSTRACT

A controller capable of improving the disappearance resistance of a synthetic resin coating of a diaphragm, and a vaporization supply device comprising the controller. The controller includes a body having an inflow passage and an outflow passage, a valve seat provided between the inflow passage and the outflow passage, a diaphragm capable of being seated on or separated from the valve seat, and an actuator for causing the diaphragm to be seated on and separated from the valve seat. The material of the valve seat is nickel-based, and the diaphragm is provided with a (Continued)

synthetic resin coating on a surface of a side to be brought into contact with the valve seat.

11 Claims, 9 Drawing Sheets

(56) References Cited

U.S. PATENT DOCUMENTS

| | | | |
|---|---|---|---|
| 10,774,938 B2* | 9/2020 | Glime, III | F16K 25/04 |
| 2003/0132415 A1 | 7/2003 | Chigasaki et al. | |
| 2006/0071192 A1 | 4/2006 | Ohmi et al. | |
| 2012/0273061 A1 | 11/2012 | Hidaka et al. | |
| 2014/0326195 A1* | 11/2014 | Gitrie | A01M 29/00 |
| | | | 119/712 |
| 2014/0326915 A1* | 11/2014 | Kitano | F16K 7/14 |
| | | | 251/360 |
| 2018/0071702 A1 | 3/2018 | Hidaka et al. | |
| 2020/0284360 A1 | 9/2020 | Le et al. | |

FOREIGN PATENT DOCUMENTS

| | | |
|---|---|---|
| TW | I243881 B | 11/2005 |
| TW | 202045843 A | 12/2020 |
| WO | 2011/067891 A1 | 6/2011 |
| WO | 2016/174832 A1 | 11/2016 |

OTHER PUBLICATIONS

Office Action issued in KR 10-2023-7031330; mailed by the Korean Intellectual Property Office on Dec. 13, 2024.

\* cited by examiner

CONTROLLER AND VAPORIZATION SUPPLY DEVICE

TECHNICAL FIELD

The present invention relates to a controller for controlling a fluid, and a vaporization supply device for supplying a gas vaporized in a vaporizer while controlling a flow of the gas by the controller.

BACKGROUND ART

Controllers for controlling fluid and vaporization supply devices are known in semiconductor manufacturing equipment and chemical plants, etc., (Patent Literatures 1 and 2, etc.). The controller includes a body having a flow path, a valve seat interposed in the flow path, a diaphragm to be seated on and separated from the valve seat, and an actuator for causing the diaphragm to be seated on and separated from the valve seat. The vaporization supply device includes a vaporizer for heating and vaporizing a liquid raw material, and the controller for controlling the vaporized gas.

The diaphragm is formed of an ultrathin metal plate. This type of diaphragm is provided with a synthetic resin coating on a surface of a side to be brought into contact with the valve seat, in order to improve the sealing property with the valve seat and to prevent corrosion due to contact with certain gas. As the synthetic resin coating, for example, a fluororesin may be used. Further, as the material of the body, stainless steel having excellent corrosion resistance is common.

PRIOR-ART DOCUMENT

Patent Documents

Patent literature 1: International Publication No. 2011/067891 pamphlet
Patent literature 2: International Publication No. 2016/174832 pamphlet

SUMMARY OF INVENTION

Technical Problem

In some of the controllers built in the vaporization supply device, a portion of the synthetic resin coating may disappear. The disappearance of the synthetic resin coating occurred in a part of the portion in contact with the valve seat.

Solution to Problem

As a result of intense research, the present inventors have found that the fluid (raw material gas) to be controlled by the control valve may contain oxygen and water vapor that should not be contained originally, the decomposition start temperature of the synthetic resin coating is lowered when oxygen and water vapor that should not be contained originally are contained in the raw material gas, and the decomposition start temperature of the synthetic resin coating may be increased by changing the material of the valve seat.

For example, in a semiconductor manufacturing line in which a vaporization supply device is incorporated, a process chamber is connected to a downstream side of the vaporization supply device through a gas supply line, and a liquid raw material such as TEOS (Tetraethyl orthosilicate) is supplied to the vaporization supply device from an upstream side of the vaporization supply device through a raw material liquid supply line. An oxygen supply line for supplying oxygen gas may be connected to the gas supply line, then the supplied oxygen gas may flow back to the upstream side through the gas supply line and reach the controller of the vaporization supply device. Further, there was a possibility that the raw material liquid supply line would be contaminated with water. In such a case, oxygen and water vapor that should not be included originally might be contained in the raw material gas to be controlled by the controller.

In order to solve the above problem, according to an embodiment of the present invention, the controller includes a body having an inflow passage and an outflow passage, a valve seat provided between the inflow passage and the outflow passage, a diaphragm capable of being separated from and seated on the valve seat, and an actuator for causing the diaphragm to be separated from and seated on the valve seat, wherein a material of the valve seat is nickel-based, and the diaphragm is provided with a synthetic resin coating on a surface of a side to be brought into contact with the valve seat.

According to another embodiment of the present invention, the material of the valve seat includes nickel or a nickel alloy.

According to another embodiment of the present invention, the valve seat is a part of the body.

According to another embodiment of the present invention, the controller further includes a valve seat element built in the body, wherein the valve seat is a part of the valve seat element, and a material of the body is stainless steel.

According to another embodiment of the present invention, the controller further includes a holder for holding the valve seat element to the body, wherein a material of the holder and the body is stainless steel.

According to another embodiment of the present invention, the valve seat is a non-nickel material with nickel plating.

According to another embodiment of the present invention, the synthetic resin coating is a fluororesin coating.

According to another embodiment of the present invention, the material of the valve seat is a material of which a decomposition start temperature of the synthetic resin coating is higher than that of stainless steel.

According to another embodiment of the present invention, the diaphragm is driven in a state where a fluid having oxygen atoms is in contact with the synthetic resin coating.

According to one embodiment of the present invention, the fluid having oxygen atoms contains oxygen and water vapor.

Further, according to an aspect of the present invention, a vaporization supply device includes a vaporizer for heating and then vaporizing a raw material, and the controller of the present invention for controlling a flow of a gas vaporized by the vaporizer.

Effect of Invention

According to the present invention, the decomposition start temperature of the synthetic resin coating can be increased than that of the conventional valve seat made of stainless steel by using nickel-based material for the valve seat. Therefore, a controller, such as a vaporization supply device, which handles fluids at high temperatures, is capable of controlling fluids at higher temperatures.

DESCRIPTION OF EMBODIMENTS

Figure 1:
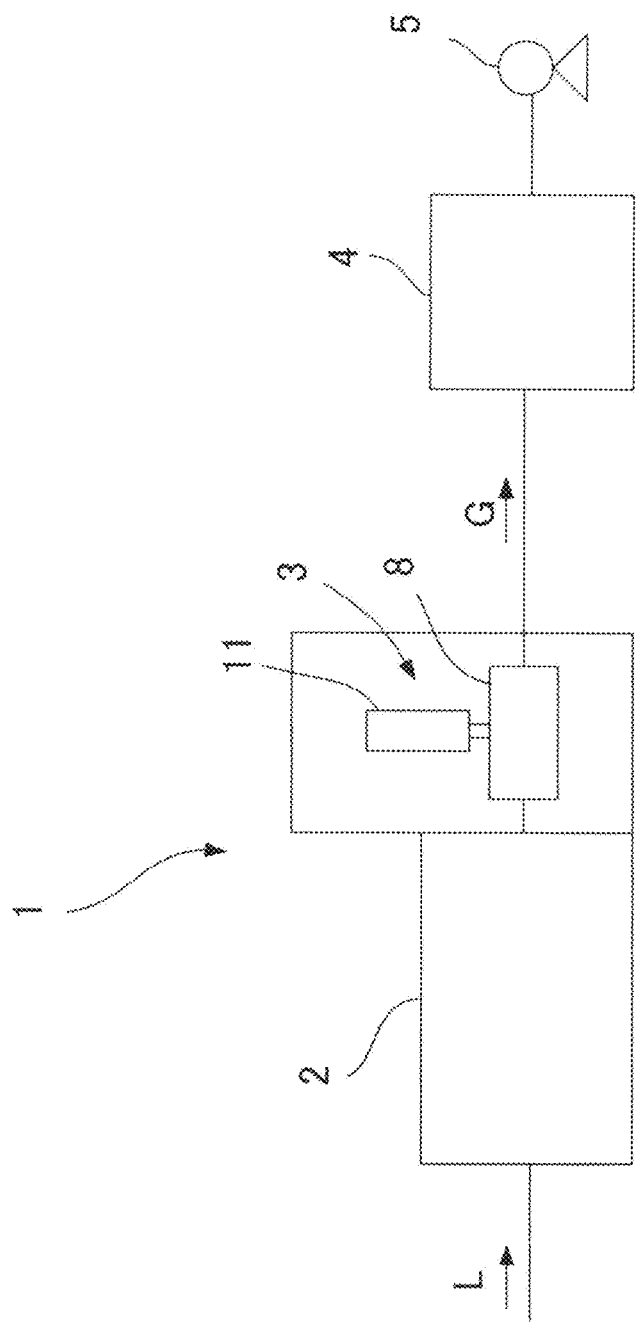
FIG. 1 is a schematic configuration diagram showing a vaporization supply device according to an embodiment of the present invention.

Embodiments of the present invention will be described below with reference to FIGS. 1 to 9. The same or similar components are denoted by the same reference numerals throughout the drawings and embodiments.

Figure 2:
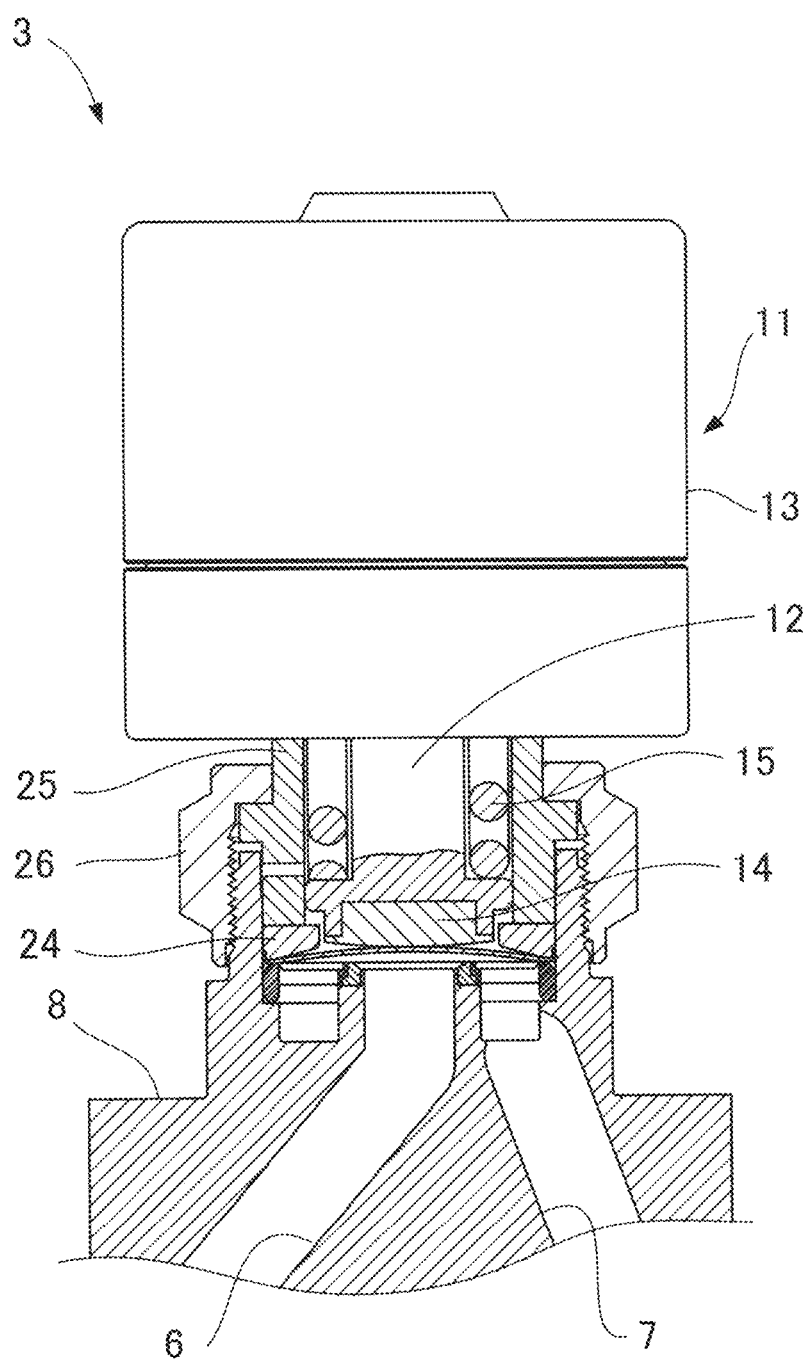
FIG. 2 is a partially enlarged local sectional view showing a controller according to an embodiment of the present invention.
Figure 3:
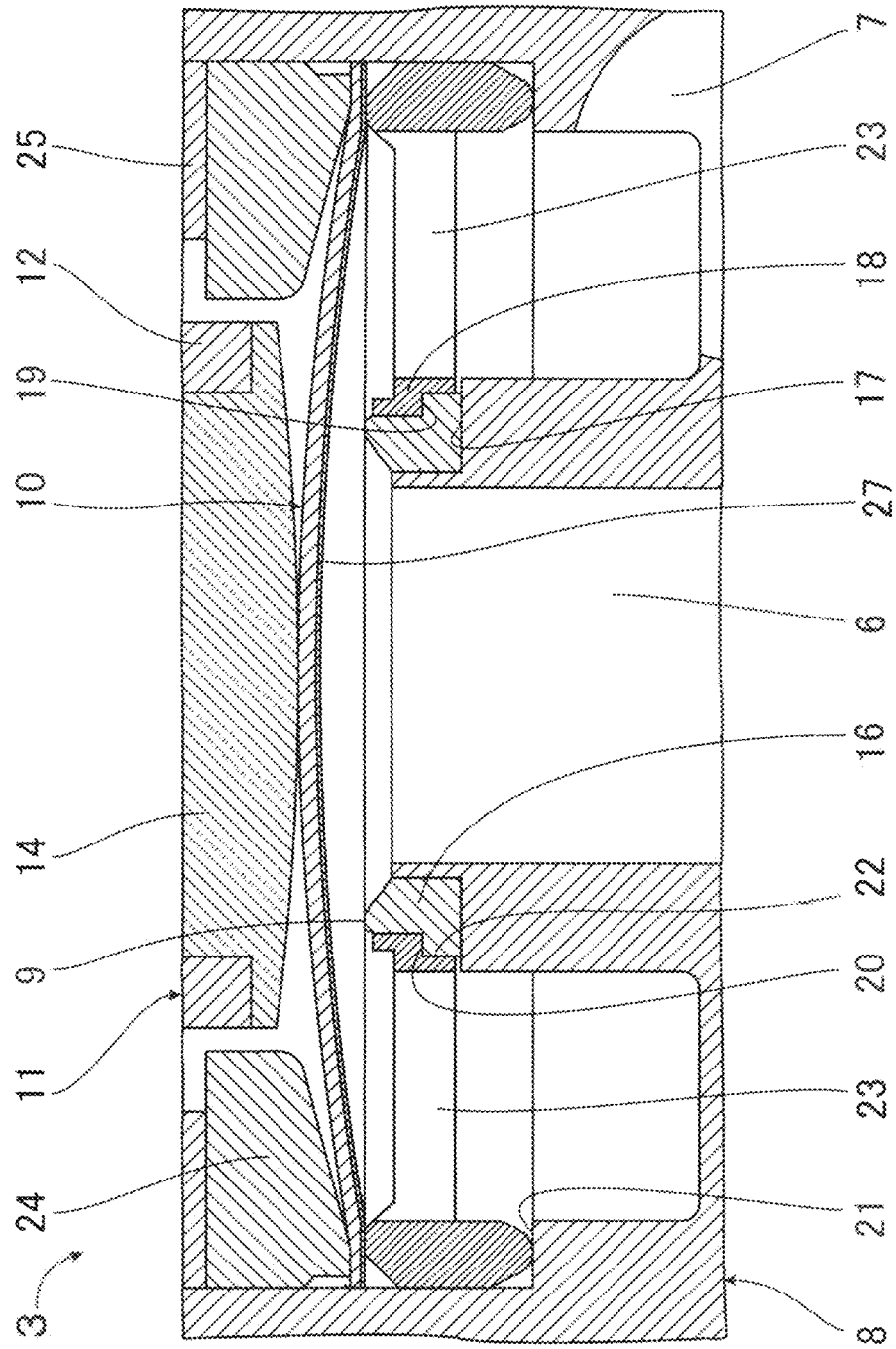
FIG. 3 is a partially enlarged view of FIG. 2.

FIG. 1 is a schematic configuration diagram showing an embodiment of a vaporization supply device, FIG. 2 is a partially enlarged view showing an embodiment of a controller, and FIG. 3 is a partially enlarged view of FIG. 2.

The vaporization supply device 1 includes a vaporizer 2 and a controller 3 connected to the vaporizer 2. The vaporizer 2 vaporizes a supplied liquid raw material L by heating. The vaporizer 2 is capable of heating the liquid raw material L to a necessary temperature for vaporization in accordance with the type thereof. A vaporized raw material gas G is controlled by the controller 3 and supplied to a process chamber 4 or the like connected to a downstream side of the vaporizer 2. In the figure, reference numeral 5 indicates a vacuum pump.

The controller 3 includes a body 8 having an inflow passage 6 and an outflow passage 7, a valve seat 9 provided between the inflow passage 6 and the outflow passage 7, a diaphragm 10 capable of being separated from and seated on the valve seat 9, and an actuator 11 for causing the diaphragm 10 to be separated from and seated on the valve seat 9.

The actuator 11 is provided with a stem 12 that is reciprocatingly movably supported in an axial direction, and a driving source 13 for actuating the stem 12. In the illustrated embodiment, the driving source 13 is an air driving source having a built-in air cylinder, but it may be a known driving source such as a hydraulic driving source having an oil cylinder, an electromagnetic driving source having an electromagnet, or a piezoelectric driving source having a piezoelectric element. The stem 12 is provided with a presser 14 abutting against the diaphragm 10. A coil spring 15 biases the stem 12 downward in the figure.

The diaphragm 10 is formed of an ultra-thin plate in a disc shape. The base material of the diaphragm 10 is a metal (including alloy) such as spron. The diaphragm 10 may be 5 to 50 mm in diameter and 20 to 400 μm thick, for example.

The valve seat 9 illustrated in FIG. 3 is part of a valve seat element 16 built in the body 8. Specifically, the top portion of the valve seat element 16 is the valve seat 9 to be brought into contact with the diaphragm 10. The valve seat element 16 has an annular shape. The valve seat element 16 is accommodated in a first housing portion 17 of the body 8 and is held by a holder 18. The valve seat element 16 and the holder 18 have stepped portions 19, 20 engaged with each other.

The holder 18 is accommodated in a second housing portion 21 of the body 8. The holder 18 includes a central hole 22, and a plurality of peripheral holes 23. The valve seat element 16 is engaged with an inner peripheral surface of the central hole 22. The plurality of peripheral holes 23 communicates with the inflow passage 6.

A peripheral portion of the diaphragm 10 is sandwiched between the holder 18 and a ring gasket 24. The ring gasket 24 is pressed against the body 8 by a bonnet 25. The bonnet 25 is fixed to the body 8 by a nut 26 screwed to the body 8. The holder 18 also functions as a gasket.

The diaphragm 10 includes a synthetic resin coating 27 on a surface of a side to be brought into contact with the valve seat 9. The synthetic resin coating 27 is preferably a fluororesin having excellent heat resistance, chemical resistance, abrasion resistance, non-sticking property, insulating property, weather resistance, and the like. The fluororesin is, for example, PFA (perfluoroalkoxy alkane), PTFE resin (polytetrafluoroethylene), or FEP resin (ethylene tetrafluoride-propylene hexafluoride copolymer).

A thickness of the synthetic resin coating 27 is, for example, about 20 to 50 μm, preferably 30 to 35 μm. The synthetic resin coating 27, for example, may be provide with an adhesive layer under the fluororesin coating, for adhering to the base metal of the diaphragm 10. The adhesive layer may be provided, for example, by applying aging heat treatment on a layer of PAI (polyamideimide) having a thickness of 5 to 10 μm.

Figure 4:
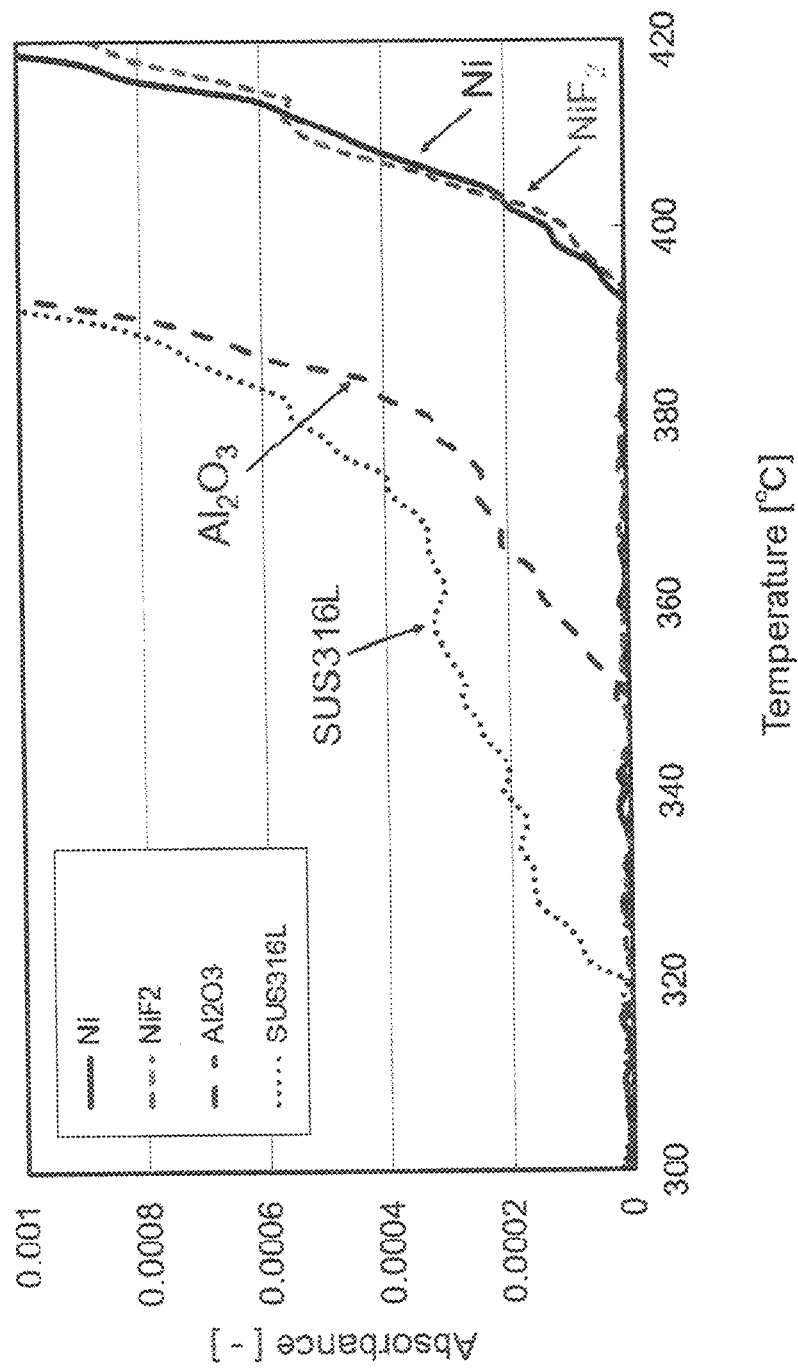
FIG. 4 a graph showing a thermal decomposition behavior of PFA (perfluoroalkoxy alkane).

FIG. 4 is a graph indicating a test result of an evaluation on the dependency of the thermal decomposition behavior of a PFA on the material of the surface to be in contacted with PFA. The horizontal axis of the graph is temperature, and the vertical axis is absorbance. In the evaluation test, the test piece of PFA was in contacted with four types of materials in an ambient of inert gas (argon gas), and components ($C_2F_4$, $C_2F_3$—O—Rf) of the gas produced by the thermal decomposition of PFA were measured by a Fourier-transform infrared spectrophotometer. As can be seen from the diagram in FIG. 4, the decomposition start temperature of PFA is higher when the test piece is in contact with Ni or $NiF_2$ than stainless steal SUS316L and $Al_2O_3$.

Figure 5:
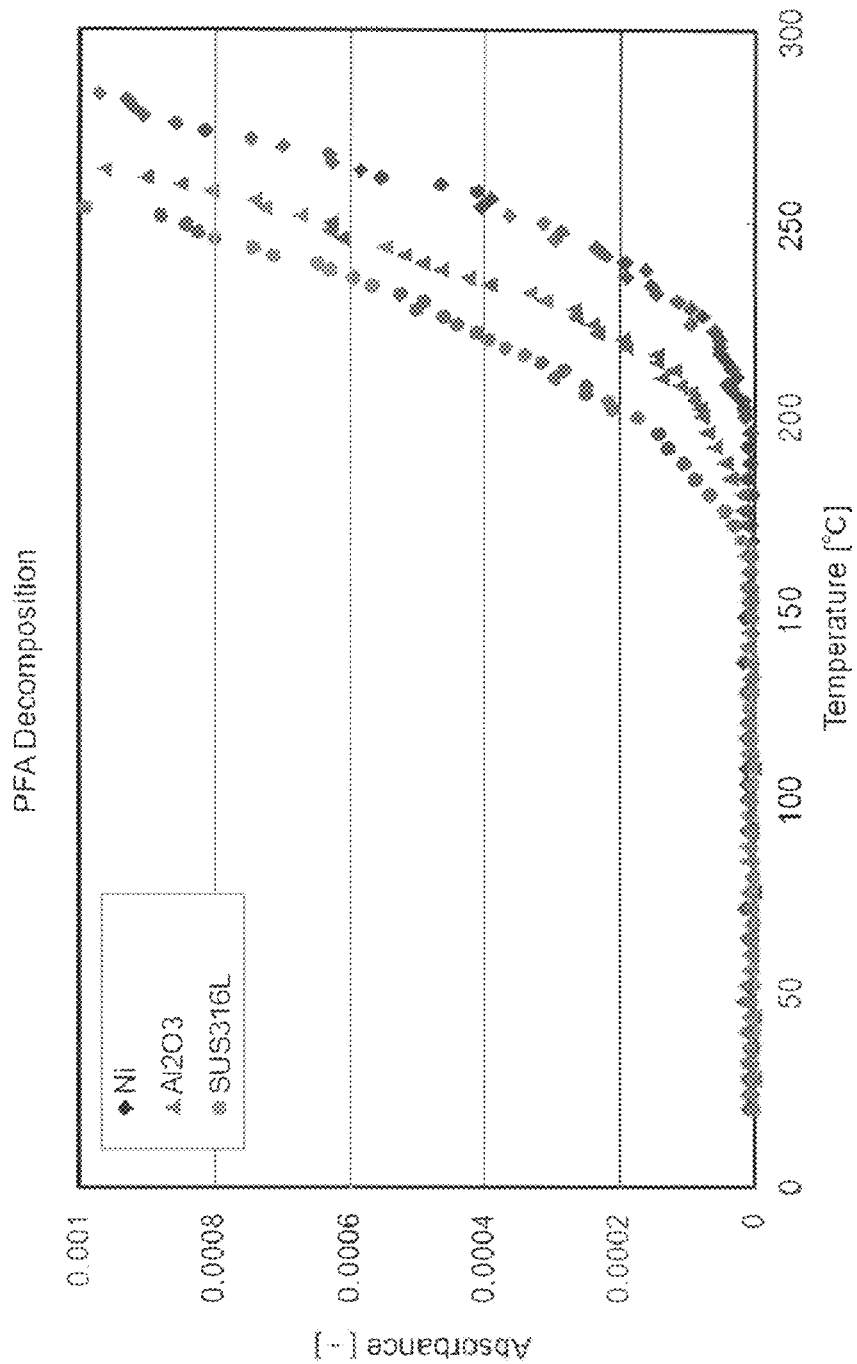
FIG. 5 is a graph showing a thermal decomposition behavior of PFA in a fluid containing oxygen and water vapor.

Next, a result of the evaluation test described above performed in an air atmosphere containing 20% concentration of oxygen and 1% of water vapor is shown in the graph of FIG. 5. Compared to the graph of FIG. 4, the thermal decomposition start temperature of PFA is lowered in the graph of FIG. 5. This is considered to be caused by the acceleration of the thermal decomposition of PFA by the oxidative decomposition reaction promoting effect of oxygen and water vapor on PFA resin. Also the diagram of FIG. 5 shows that the decomposition start temperature of PFA is higher in Ni than that in stainless-steel, even in atmospheres containing oxygen and water vapor.

Figure 6:
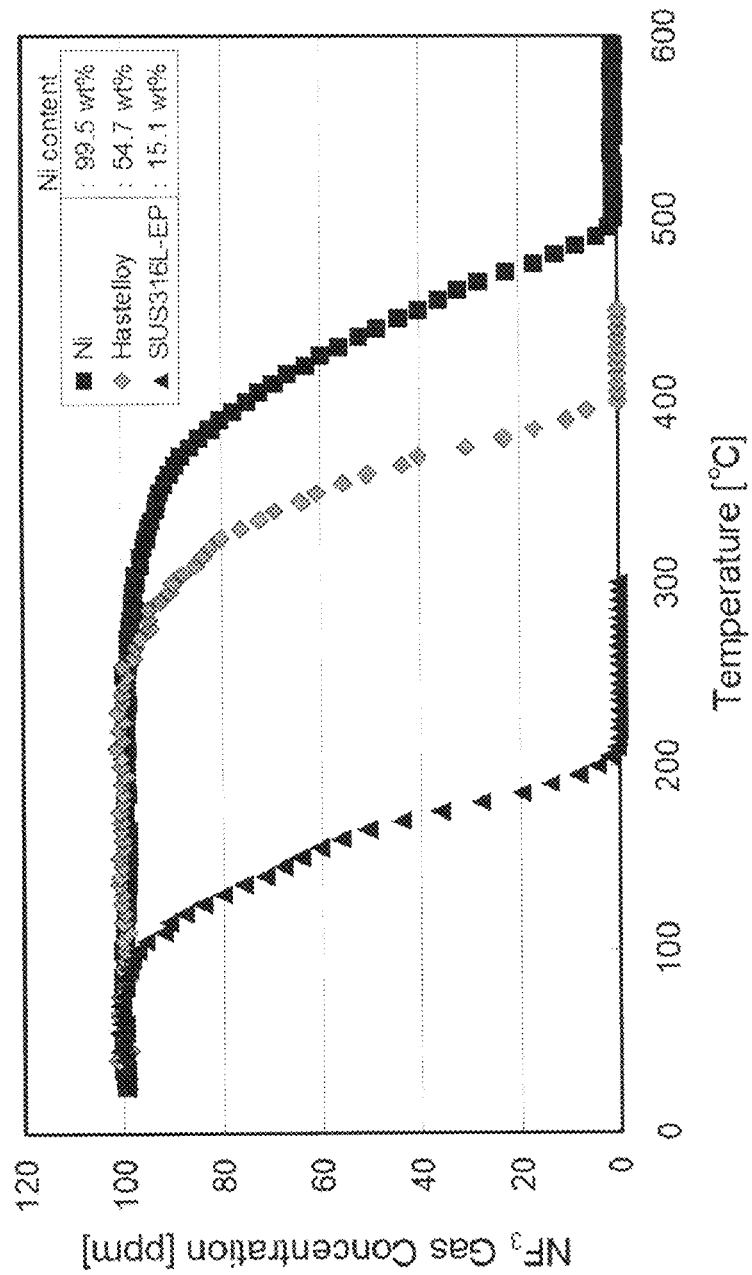
FIG. 6 is a graph showing a thermal decomposition behavior of fluorinated gases ($NF_3$).

FIG. 6 is a graph indicating the contact-surface dependency of the thermal decomposition behavior of fluorinated gas ($NF_3$). The horizontal axis of the graph represents temperature, and the vertical axis represents concentration of the $NF_3$ gas. In FIG. 6, the material of the surface being in contact with the fluorinated gas is Ni, Hastelloy, and stainless-steel (SUS316L). The composition (wt %) of Hastelloy (HASTELLOY-C22) is Fe: 4.0, Cr: 21.2, Ni: 54.7, Mo: 13.5, Co: 2.5 or less, W: 4.5. The composition (wt %) of the stainless-steel (SUS316L-EP) is Cr: 17.2, Ni: 15.1, Mo: 2.8, and the rest is Fe. The graph of FIG. 6 shows that the more the Ni content, the higher the decomposition start temperature of the fluorinated gas ($NF_3$). This is considered to be because Ni is less reactive with fluorine atoms compared with other metals.

According to the above description, in the present invention, as the material of the valve seat 9 being in contact with the synthetic resin coating 27, a material of which a decomposition start temperature of the synthetic resin coating 27 is higher than that of stainless steel, and a nickel-based material is used. In particular, as the material of the valve seat 9, it is preferable to use a material of which the decomposition start temperature of the synthetic resin coating 27 is higher than that of stainless steel, even in a state of being in contact with a fluid containing at least any one of oxygen and water vapor. As used herein, the "nickel-based material" includes nickel and nickel alloys. The nickel alloys include nickel-based alloys such as Hastelloy; Invar; SPRON510; Inconel.

In the embodiment shown in FIG. 3, the material of the valve seat element 16 is a nickel-based material. Since nickel and nickel alloys are considerably more expensive than stainless steel, the material of the holder 18 and the body 8 is preferably stainless steel.

Figure 7:
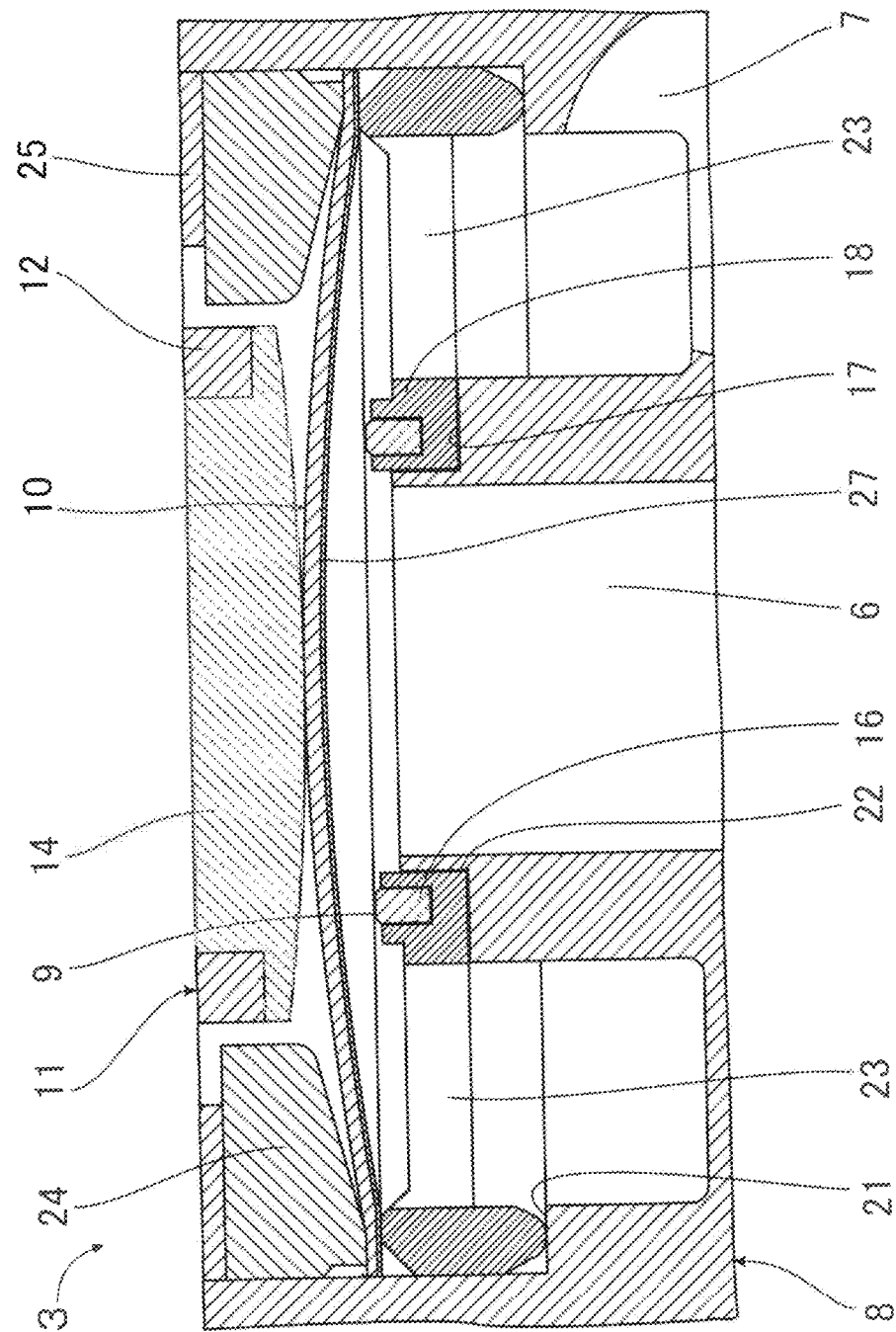
FIG. 7 is a partially enlarged sectional view showing a controller according to another embodiment of the present invention.

FIG. 7 is a partial sectional view showing a controller including a valve seat element in another embodiment. The valve seat element 16 is fitted into the annular recess of a holder 18 and is held by the holder 18 through swaging or the like. Also in this example, the material of the valve seat element 16 is a nickel-based material, preferably, the material of the holder 18 and the body 8 is stainless steel.

Figure 8:
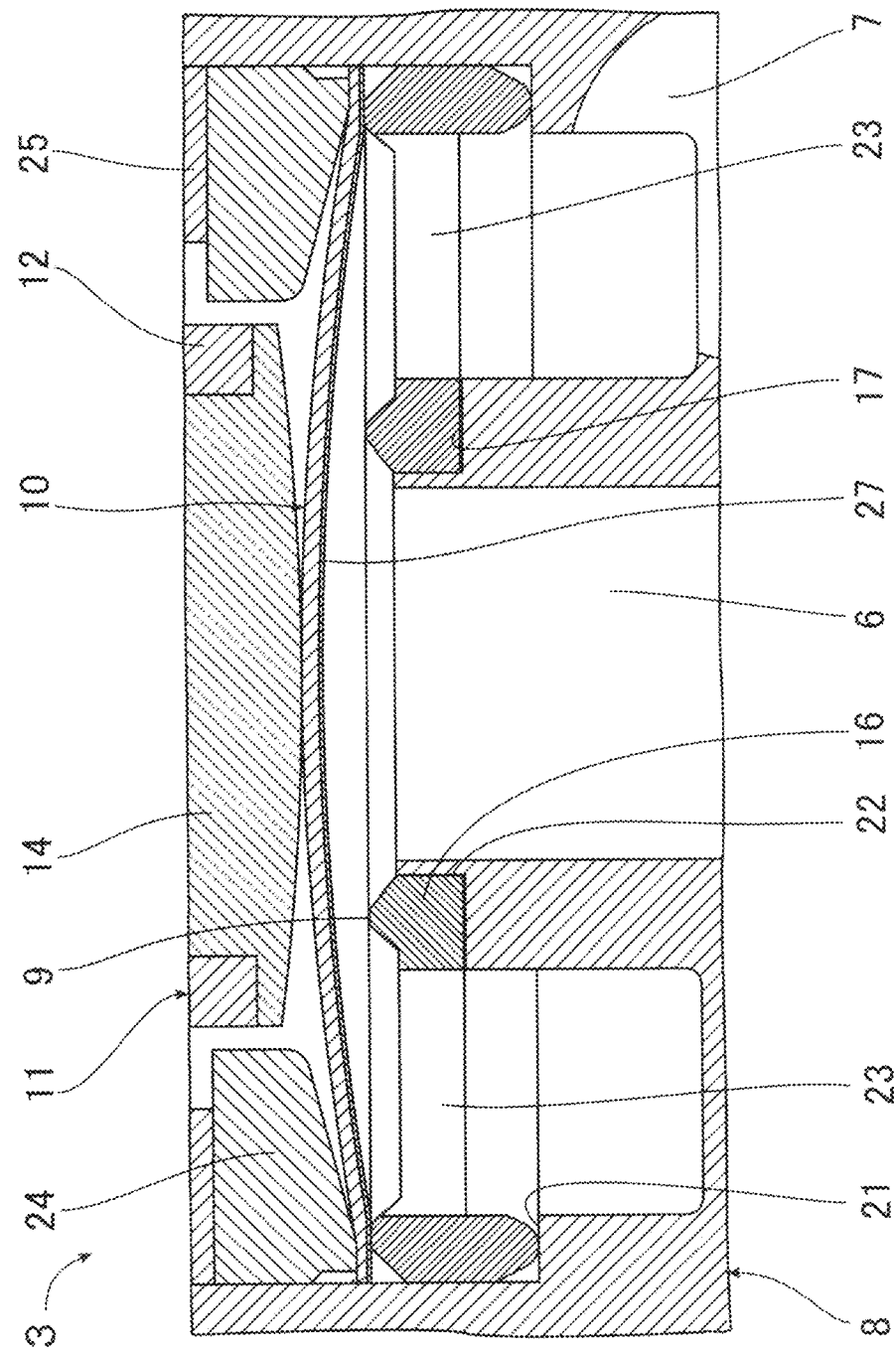
FIG. 8 is a partially enlarged sectional view showing a controller according to another embodiment of the present invention.

FIG. 8 is a local sectional view showing a controller including a valve seat element in still another embodiment. In FIG. 8, the valve seat element 16 is configured such that the valve seat element 16 and the holder 18 shown in FIG. 7 are structured as one integrated body, but not separated. Accordingly, the valve seat element 16 in FIG. 8 is provided with a central hole 22 and peripheral holes 23. Further, the peripheral portion of the valve seat element 16 abuts against the second housing portion 21 and the diaphragm 10 and is fixed to the body 8. In addition, the peripheral portion of the central hole 22 of the valve seat element 16 is placed in the first housing portion 17. In this example, the material of the valve seat element 16 is a nickel-based material, preferably, the material of the body 8 is stainless steel.

In the configurations shown in FIGS. 3, 7, and 8, the valve seat element 16 may be a base material of stainless steel applied with nickel plating, and the base material may also be copper, iron, or any metal other than nickel.

Figure 9:
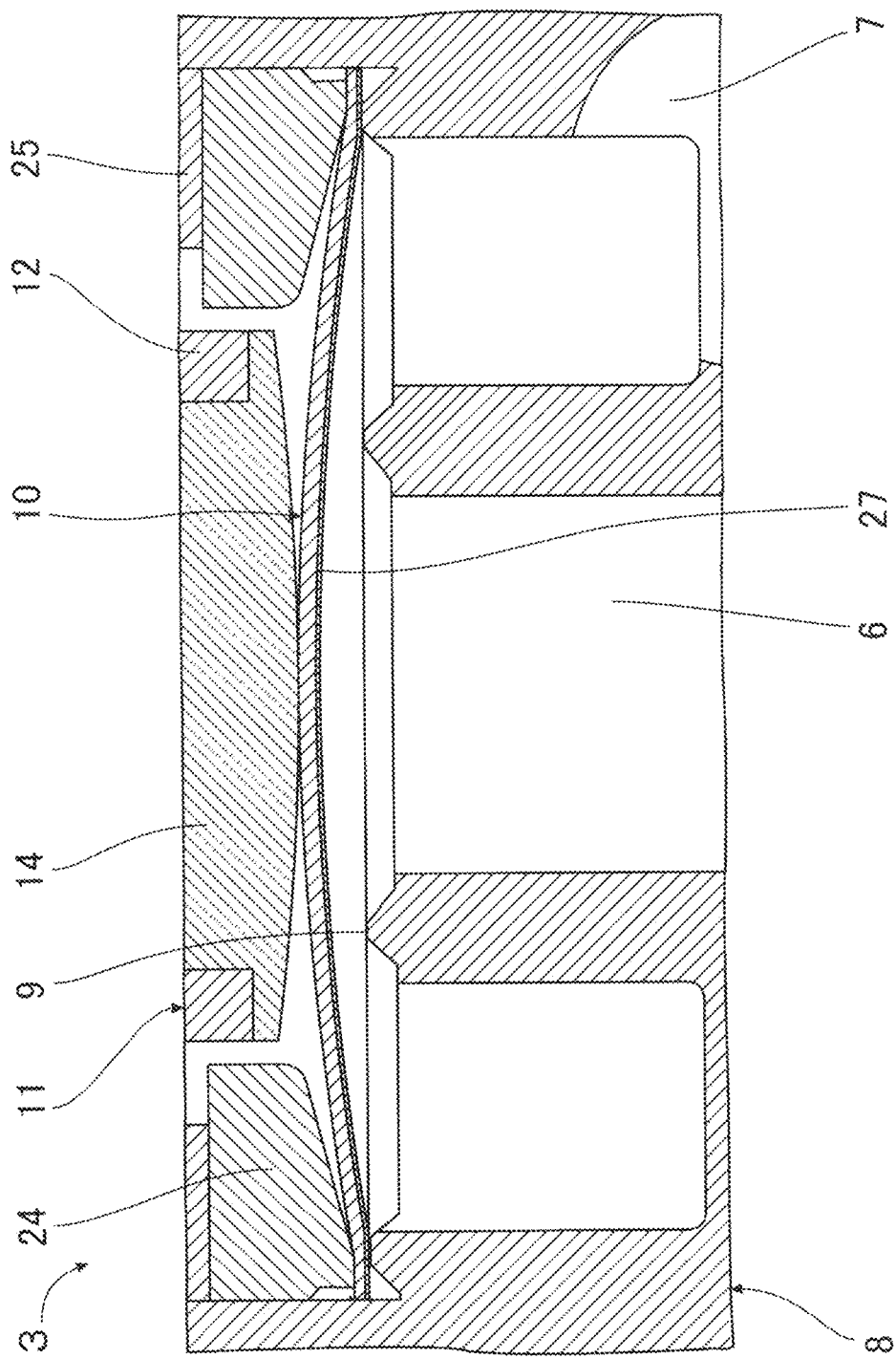
FIG. 9 is a partially enlarged sectional view showing a controller according to another embodiment of the present invention.

In the embodiment shown in FIG. 9, a valve seat 9 is a part of a body 8. Therefore, the material of the body 8 is a nickel-based material. Also in the configuration shown in FIG. 9, the body 8 may be a base material of stainless steel applied with nickel plating. The base metal may be copper, iron, or any metal other than nickel.

The controller 3 comprising the above configuration has a higher decomposition start temperature of the synthetic resin coating 27 than that of the valve seat made from stainless steel, even when a fluid containing oxygen and water is controlled at high temperatures, therefore, it is possible to control the fluid at higher temperatures, even in a controller for handling high-temperature fluids, such as a vaporization supply device.

In particular, the vaporization supply device in a semiconductor manufacturing line vaporizes a liquid raw material such as TEOS (Tetraethyl orthosilicate) and supplies the vaporized raw material gas to the process chamber 4. Even when the raw material gas originally containing no oxygen or water vapor is supplied from the vaporization supply device to the process chamber, oxygen and water vapor may be contained in the gas passing through the controller. For example, an oxygen supply line may be connected in the middle of a gas supply line connecting the vaporization supply device and the process chamber. In such a case, oxygen may flow back through the gas supply line to reach the vaporization supply device. In addition, water may also be contained in the raw material liquid supply line for supplying the liquid raw material to the vaporization supply device. The decomposition start temperature of the synthetic resin coating of the diaphragm is lowered by the oxidative decomposition reaction accelerating effect of oxygen and water vapor on PFA resin. Even in such a situation, in the present invention, as described above, the decomposition start temperature of the synthetic resin coating is higher than that of conventional valve seat made from stainless steel. Thereby making it possible to supply fluids at higher temperatures.

The present invention is not construed as being limited to the above-described embodiments, and various modifications are possible within the range that does not deviate from the spirit of the present invention.

REFERENCE SIGNS LIST

1 Vaporization supply device
2 Vaporizer
3 Controller
6 Inflow passage
7 Outflow passage
8 Body
9 Valve seat
10 Diaphragm
11 Actuator
16 Valve seat element
18 Holder
27 Synthetic resin coating

What is claimed is:
1. A controller comprising:
 a body including an inflow passage, an outflow passage, and a valve seat provided between the inflow passage and the outflow passage;
 a diaphragm capable of being seated on and separated from the valve seat; and
 an actuator for causing the diaphragm to be seated on and separated from the valve seat,
 wherein a material of a point of the valve seat that is brought into contact with the diaphragm is nickel-based, and the diaphragm is provided with a synthetic resin coating on a surface of a side to be brought into contact with the valve seat.
2. The controller according to claim 1, wherein the material of the valve seat comprises nickel or a nickel alloy.
3. The controller according to claim 1, wherein the valve seat is a part of the body.

4. The controller according to claim 1, further comprising a valve seat element built in the body, wherein the valve seat is a surface of the valve seat element, and a material of the body is stainless steel.

5. The controller according to claim 4, further comprising a holder for holding the valve seat element to the body, wherein a material of the holder and the body is stainless steel.

6. The controller according to claim 1, wherein the valve seat is nickel plated over a non-nickel base material.

7. The controller according to claim 1, wherein the synthetic resin coating is a fluororesin coating.

8. The controller according to claim 1, wherein the material of the valve seat is a material that increases a decomposition start temperature of the synthetic resin coating higher than a decomposition start temperature of the synthetic resin coating when stainless steel is used.

9. The controller according to claim 1, wherein the diaphragm is configured to be driven in a state where a fluid having oxygen atoms is in contact with the synthetic resin coating.

10. The controller according to claim 9, wherein the fluid having oxygen atoms contains oxygen and water vapor.

11. A vaporization supply device comprising:
   a vaporizer for heating and vaporizing a raw material; and
   the controller according to claim 1, for controlling a flow of a gas vaporized by the vaporizer.

\* \* \* \* \*